United States Patent
Nübling et al.

(10) Patent No.: US 12,413,452 B2
(45) Date of Patent: Sep. 9, 2025

(54) DIFFERENTIAL DATA TRANSMISSION BETWEEN GALVANICALLY ISOLATED CIRCUITS WITHIN A CIRCUIT PACKAGE

(71) Applicant: Infineon Technologies AG, Neubiberg (DE)

(72) Inventors: Marcus Nübling, Olching-Esting (DE); Marco Bachhuber, Neuried (DE)

(73) Assignee: Infineon Technologies AG, Neubiberg (DE)

( * ) Notice: Subject to any disclaimer, the term of this patent is extended or adjusted under 35 U.S.C. 154(b) by 66 days.

(21) Appl. No.: 18/492,540

(22) Filed: Oct. 23, 2023

(65) Prior Publication Data

US 2025/0132956 A1 Apr. 24, 2025

(51) Int. Cl.
*H04L 25/02* (2006.01)
(52) U.S. Cl.
CPC ................ *H04L 25/0266* (2013.01)
(58) Field of Classification Search
CPC . H03K 17/722; H04L 25/026; H04L 25/0264; H04L 25/0266; H04L 25/0268; H04L 25/0272
USPC ............... 375/219, 220, 256–258, 262, 265; 333/101, 104, 115, 119, 24.2, 177
See application file for complete search history.

(56) References Cited

U.S. PATENT DOCUMENTS

| | | | |
|---|---|---|---|
| 9,673,809 B1 * | 6/2017 | Kandah | H03K 17/691 |
| 10,511,291 B1 * | 12/2019 | Kandah | H03K 17/567 |
| 11,146,341 B1 * | 10/2021 | Nuebling | H04B 1/40 |
| 2017/0302431 A1 * | 10/2017 | Lugthart | H04L 7/0016 |
| 2020/0067568 A1 * | 2/2020 | Spirkl | H04B 1/0475 |
| 2023/0387782 A1 * | 11/2023 | May | H03K 17/691 |

OTHER PUBLICATIONS

"Galvanic Isolated Gate Driver", Retrieved from:https://www.infineon.com/cms/en/product/power/gate-driver-ics/galvanic-isolated-gate-driver/#!documents; Accessed on Oct. 20, 2023,.21 pp.

* cited by examiner

*Primary Examiner* — Young T. Tse
(74) *Attorney, Agent, or Firm* — Shumaker & Sieffert, P.A.

(57) ABSTRACT

In some examples, a method comprises communicating first data between a first circuit and a second circuit via a differential communication channel across a galvanic isolation barrier within a circuit package, wherein the first data is coded via a first coding technique that comprises ON-OFF shift Keying (OOK) with a differential carrier signal. The method also includes communicating second data between the first circuit and the second circuit via the differential communication channel across the galvanic isolation barrier within the circuit package, wherein the second data is coded via a second coding technique comprises differential pulse coding.

19 Claims, 14 Drawing Sheets

DIFFERENTIAL DATA TRANSMISSION BETWEEN GALVANICALLY ISOLATED CIRCUITS WITHIN A CIRCUIT PACKAGE

TECHNICAL FIELD

This disclosure relates to devices that include a galvanic isolation barrier that is formed between two different circuits within a circuit package, and techniques for communicating data across the galvanic isolation barrier within the circuit package.

BACKGROUND

Galvanic isolation may be used in electronic devices to separate two voltage domains inside of a circuit package. As one example, a microcontroller may generate and deliver control signals to a low-side gate driver and a high-side gate driver for controlling low-side and high-side power switches arranged in a half-bridge circuit. Galvanic isolation may be desirable to ensure that the microcontroller is protected from a high voltage domain associated with one or both of the gate drivers. The microcontroller and one or both of the gate drivers may be configured to operate in different power domains.

Gate drivers for power switches is just one example where galvanic isolation is used, but galvanic isolation may also be used for other purposes. In general, when galvanic isolation is desirable, circuit packages can be defined with two different circuits that are galvanically isolated. The galvanic isolation can be achieved by using a transformer to galvanically isolate a low voltage domain of a first circuit from a high voltage domain of the second circuit or by using one or more capacitors to galvanically isolate a low voltage domain of a first circuit from a high voltage domain of the second circuit. Communicating data across the galvanic isolation barrier, e.g., within a circuit package, is desirable to facilitate control of circuits in the high voltage domain based on control signals generated in the low voltage domain.

SUMMARY

This disclosure describes circuit package devices and techniques for communicating data within circuit package devices. In particular, this disclosure describes techniques for communicating over a galvanic isolation barrier that is formed between two different circuits within a circuit package. A differential communication channel may be configured to communicate data between the first circuit and the second circuit across the galvanic isolation barrier within the circuit package.

According to this disclosure, the first circuit and the second circuit may be configured to code the data within the circuit package using two different coding techniques, and the circuits may communicate the coded data over the galvanic isolation barrier. A first coding technique used in the circuit package for communicating over the galvanic isolation barrier may comprise ON-OFF shift Keying (OOK) with a differential carrier signal, and a second coding technique used in the circuit package for communicating over the galvanic isolation barrier may comprise differential pulse coding.

In some examples, this disclosure describes a device arranged to include a galvanic isolation barrier between a first voltage domain and a second voltage domain, the device comprising a first circuit configured to operate in the first voltage domain; a second circuit configured to operate the second voltage domain; one or more isolation elements configured to define the galvanic isolation barrier between a first voltage domain and a second voltage domain; and a differential communication channel configured to communicate data between the first circuit and the second circuit across the galvanic isolation barrier, wherein the first circuit and the second circuit are configured to code the data across the differential communication channel using a first coding technique and a second coding technique, wherein the first coding technique comprises OOK with a differential carrier signal, and wherein the second coding technique comprises differential pulse coding.

In some examples, this disclosure describes a method that comprises communicating first data between a first circuit and a second circuit via a differential communication channel across a galvanic isolation barrier within a circuit package, wherein the first data is coded via a first coding technique that comprises OOK with a differential carrier signal; and communicating second data between the first circuit and the second circuit via the differential communication channel across the galvanic isolation barrier within the circuit package, wherein the second data is coded via a second coding technique comprises differential pulse coding.

The details of one or more examples are set forth in the accompanying drawings and the description below. Other features, objects, and advantages will be apparent from the description and drawings, and from the claims.

DETAILED DESCRIPTION

This disclosure describes circuit package devices and techniques for communicating data within circuit package devices. In particular, this disclosure describes techniques for communicating over a galvanic isolation barrier that is formed between two different circuits within a circuit package. As an example, the first circuit may operate in a first voltage domain (e.g., a low voltage domain less than 40 volts) and the second circuit may operate in a second voltage domain (e.g., a high voltage domain greater than 100 volts).

The first and second circuits may be embedded in a molding material within the circuit package and the first and second circuits may be mechanically separated from one another within the circuit package by less than 5 millimeters, less than 3 millimeters, or less than one millimeter. The galvanic isolation barrier may be achieved using one or more inductors and/or one or more capacitors. The one or more inductors and/or one or more capacitors that define the galvanic isolation may also form the communication channel for communicating data between the two different circuits within the circuit package.

The communication channel between the first circuit and the second circuit across the galvanic isolation barrier may comprise a differential communication channel. According to this disclosure, the first circuit and the second circuit may be configured to code the data across the differential communication channel using two different coding techniques. A first coding technique used in the circuit package for communicating over the galvanic isolation barrier may comprise ON-OFF shift Keying (OOK) with a differential carrier signal, and a second coding technique used in the circuit package for communicating over the galvanic isolation barrier may comprise differential pulse coding.

Figure 1A:
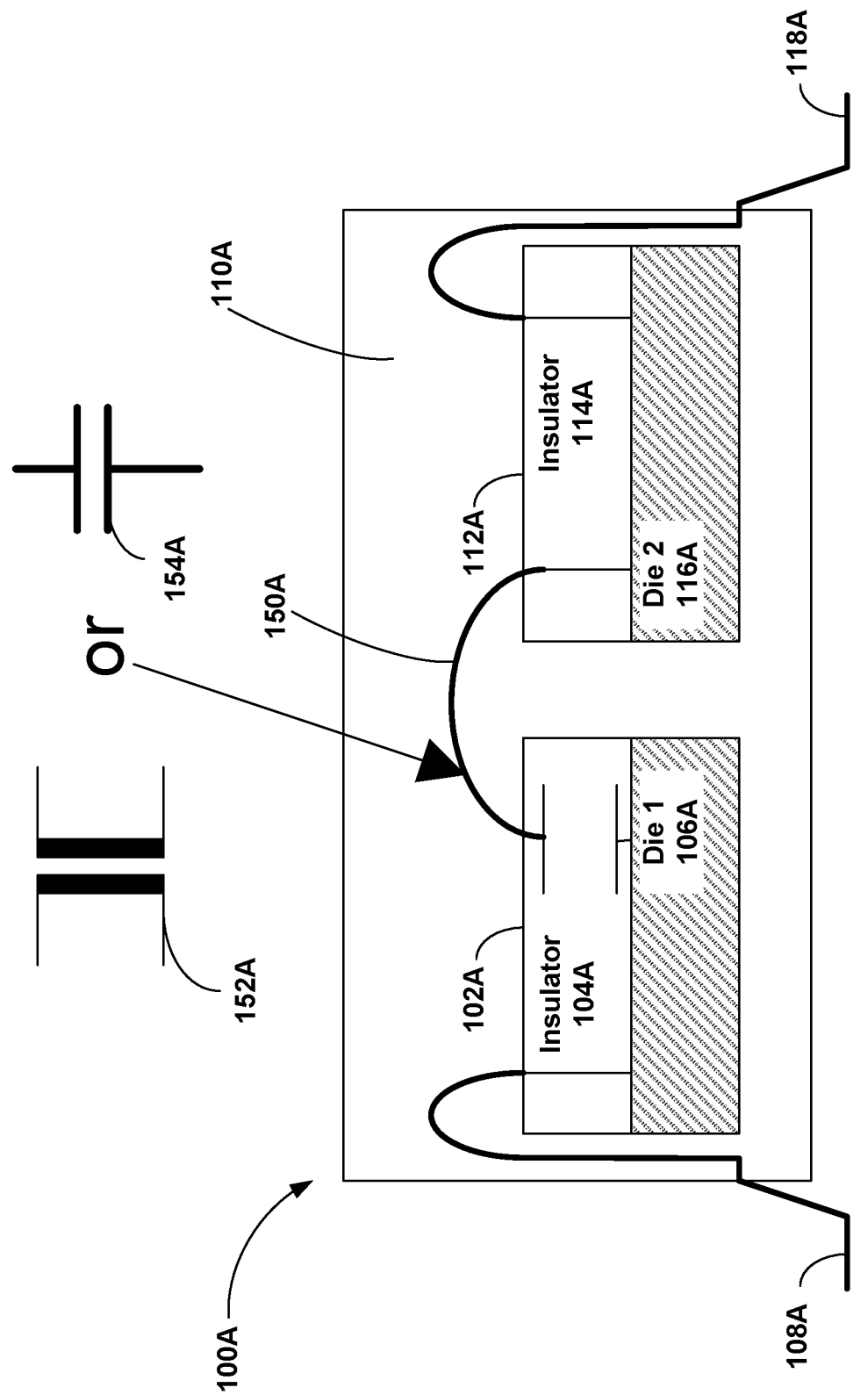
FIGS. 1A-1C are conceptual cross-sectional side views of circuit packages that include two different circuits separated by a galvanic isolation barrier.

FIG. 1A is a conceptual cross-sectional side view of a device that comprises a circuit package 100A. Circuit package 100A comprises a first circuit 102A that is configured to operate in a first voltage domain and a second circuit 112A that is configured to operate in a second voltage domain. The first voltage domain is different than the second voltage domain. For example, the first voltage domain may comprise a low voltage domain that is less than 40 volts and the second voltage domain may comprise a high voltage domain that is greater than 100 volts. Circuit 102A may comprise a first circuit die 106A and circuit 112A may comprise a second circuit die 116A. One or more first external conductors 108A may be electrically connected to first circuit die 106A, and similarly, one or more second external conductors 118A may be electrically connected to second circuit die 116A. An insulator material 104A may be formed over first circuit die 106A, and similarly, an insulator material 114A may be formed over second circuit die 116A.

In circuit package 100A, one or more isolation elements (e.g., inductor(s) 152A or capacitor(s) 154A) are configured to define the galvanic isolation barrier between a first voltage domain and a second voltage domain. Inductors 152A for example may be arranged to define a transformer, such as a coreless transformer. The one or more isolation elements (e.g., inductor(s) 152A or capacitor(s) 154A) also define a differential communication channel 150A that is configured to communicate data between first circuit 102A and second circuit 112A across the galvanic isolation barrier. In the example shown in FIG. 1A, the one or more isolation elements (e.g., inductor(s) 152A or capacitor(s) 154A) may be embedded in insulator 104A associated with first circuit 102A, which operates in the low voltage domain. In some examples, grounded guard bands may surround the isolation elements, and in some examples, a grounded guard band may also surround circuit 102A that operates in the low voltage domain. The grounded guard bands (not shown) may improve the galvanic isolation between the two different circuits. A molding material 110A may encapsulate circuits 102A, 112A so as to define circuit package 100A. Other devices or circuits may connect to circuit package 100A via external conductors 108A, 118A.

As described in greater detail below, first circuit 102A and second circuit 112A may be configured to code the data across differential communication channel 150A within circuit package 100A using two different coding techniques. A first coding technique comprises ON-OFF shift Keying (OOK) with a differential carrier signal, and a second coding technique comprises differential pulse coding.

Figure 1B:
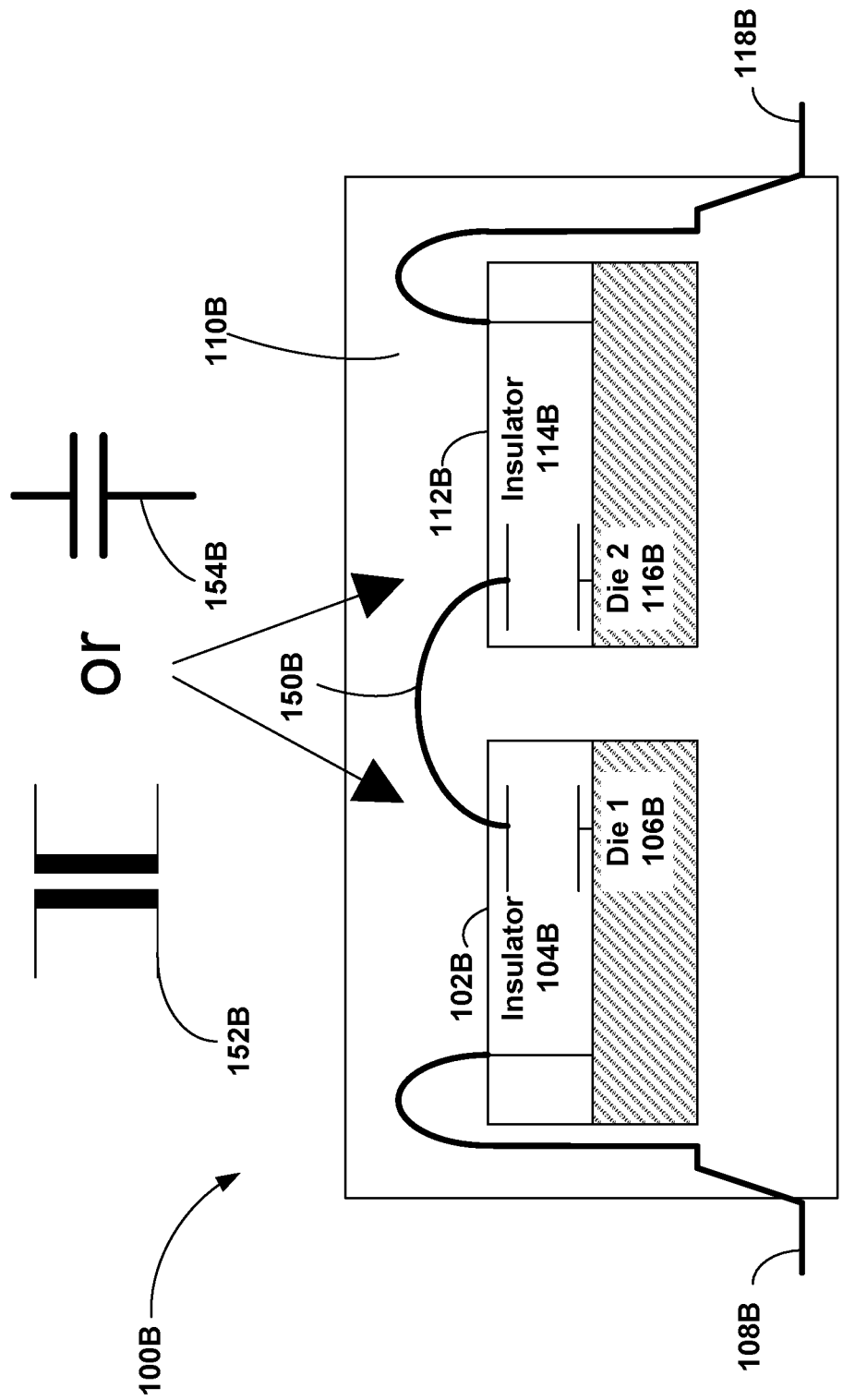

FIG. 1B is a conceptual cross-sectional side view of a device that comprises a circuit package 100B. Circuit package 100B of FIG. 1B is very similar to circuit package 100A of FIG. 1A in many respects. Circuit package 100B comprises a first circuit 102B that is configured to operate in a first voltage domain and a second circuit 112B that is configured to operate in a second voltage domain. The first voltage domain is different than the second voltage domain. Again, for example, the first voltage domain may comprise a low voltage domain that is less than 40 volts and the second voltage domain may comprise a high voltage domain that is greater than 100 volts. Circuit 102B may comprise a first circuit die 106B and circuit 112B may comprise a second circuit die 116B. One or more first external conductors 108B may be electrically connected to first circuit die 106B, and similarly, one or more second external conductors 118B may be electrically connected to second circuit die 116B. An insulator material 104B may be formed over first circuit die 106B, and similarly, an insulator material 114B may be formed over second circuit die 116B.

In circuit package 100B, one or more isolation elements (e.g., inductor(s) 152B or capacitor(s) 154B) are configured to define the galvanic isolation barrier between a first voltage domain and a second voltage domain. The one or more isolation elements (e.g., inductor(s) 152B or capacitor(s) 154B) also define a differential communication channel 150B that is configured to communicate data between first circuit 102B and second circuit 112B across the galvanic isolation barrier. In the example shown in FIG. 1B, the one or more isolation elements (e.g., inductor(s) 152B or capacitor(s) 154B) are embedded in insulator 104B associated with first circuit 102B and within insulator 114B associated with second circuit 112B. In some examples, grounded guard bands may surround the isolation elements, and in some examples, a grounded guard band may also surround one or both of circuits 102B, 112B. A molding material 110B may encapsulate circuits 102B, 112B so as to define circuit package 100B. Other devices or circuits may connect to circuit package 100B via external conductors 108B, 118B.

As with the example shown in FIG. 1A, in FIG. 1B first circuit 102B and second circuit 112B may be configured to code the data across differential communication channel 150B within circuit package 100B using two different coding techniques. A first coding technique OOK with a differential carrier signal, and a second coding technique comprises differential pulse coding.

Figure 1C:
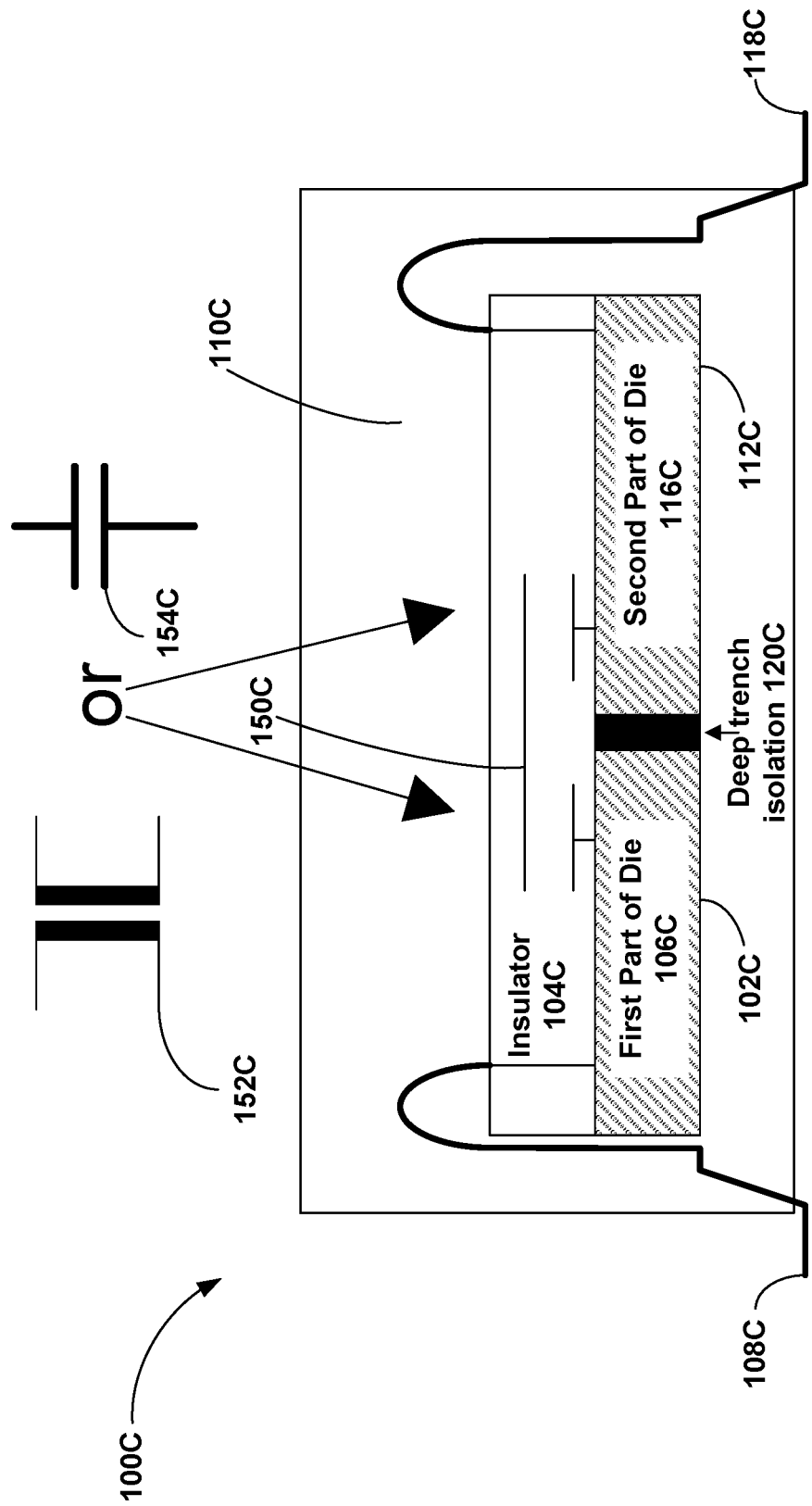

FIG. 1C is a conceptual cross-sectional side view of a device that comprises a circuit package 100C. Circuit package 100C of FIG. 1C is very similar to circuit packages 100A. 100B of FIGS. 1A and 1B in many respects. Circuit package 100C comprises a first circuit 102C that is configured to operate in a first voltage domain and a second circuit 112C that is configured to operate in a second voltage domain. The first voltage domain is different than the second voltage domain. Again, for example, the first voltage domain may comprise a low voltage domain that is less than 40 volts and the second voltage domain may comprise a high voltage domain that is greater than 100 volts. In the example shown in FIG. 1C, first circuit 102C and second circuit 112C are formed in the same circuit die. In this case, in order to ensure galvanic isolation between first circuit 102C and second circuit 112C, a deep trench 120C is formed in the circuit die between first circuit 102C and second circuit 112C to achieve isolation.

One or more first external conductors 108C may be electrically connected to first part of die 106C, and similarly, one or more second external conductors 118C may be electrically connected to second part of die 116C. An insulator material 104C may be formed over the circuit die that defines first circuit 102C and second circuit 112C.

In circuit package 100C, one or more isolation elements (e.g., inductor(s) 152C or capacitor(s) 154C) are within insulator 104C and configured to define the galvanic isolation barrier between a first voltage domain and a second voltage domain. The one or more isolation elements (e.g., inductor(s) 152C or capacitor(s) 154C) also define a differential communication channel 150C that is configured to communicate data between first circuit 102C and second circuit 112C across the galvanic isolation barrier. In the example shown in FIG. 1C, the one or more isolation elements (e.g., inductor(s) 152B or capacitor(s) 154B) are embedded in insulator 104C that is formed over the common circuit die that defines both first circuit 102C and second circuit 112C. In some examples, grounded guard bands may surround the isolation elements, and in some examples, a grounded guard band may also surround one or both of circuits 102C, 112C. A molding material 110C may encapsulate circuits 102C, 112C so as to define circuit package 100C. Other devices or circuits may connect to circuit package 100C via external conductors 108C, 118C.

Like the examples shown in FIGS. 1A and 1B, in the example shown in FIG. 1C, first circuit 102C and second circuit 112C may be configured to code the data across differential communication channel 150C within circuit package 100C using two different coding techniques. A first coding technique OOK with a differential carrier signal, and a second coding technique comprises differential pulse coding.

In some various examples, the first circuit 102A, 102B, 102C may operate in a low voltage domain, such as a voltage domain associated with a microcontroller, e.g., 5 volts, 3.3 volts, or another voltage typically used for low voltage microcontrollers. The second circuit 112A, 112B, 112C may operate in a high voltage domain, such as a voltage domain associated with a high voltage power switch, e.g., 400-6000 volts associated with an insulated-gate bipolar transistor (IGBT), 600-1200 volts associated with a silicon carbide (SiC) metal oxide semiconductor field effect transistor (MOSFET), 600-1200 volts associated with a gallium nitride (GaN) field effect transistor (FET), or even higher voltages associated with a gate turn on (GTO) thyristor, another type of thyristor, or another type of power switch. In still other examples, the techniques and circuits of this disclosure may be used in any circuit package device where communication over a galvanic isolation barrier is performed within the circuit package device.

Figure 2:
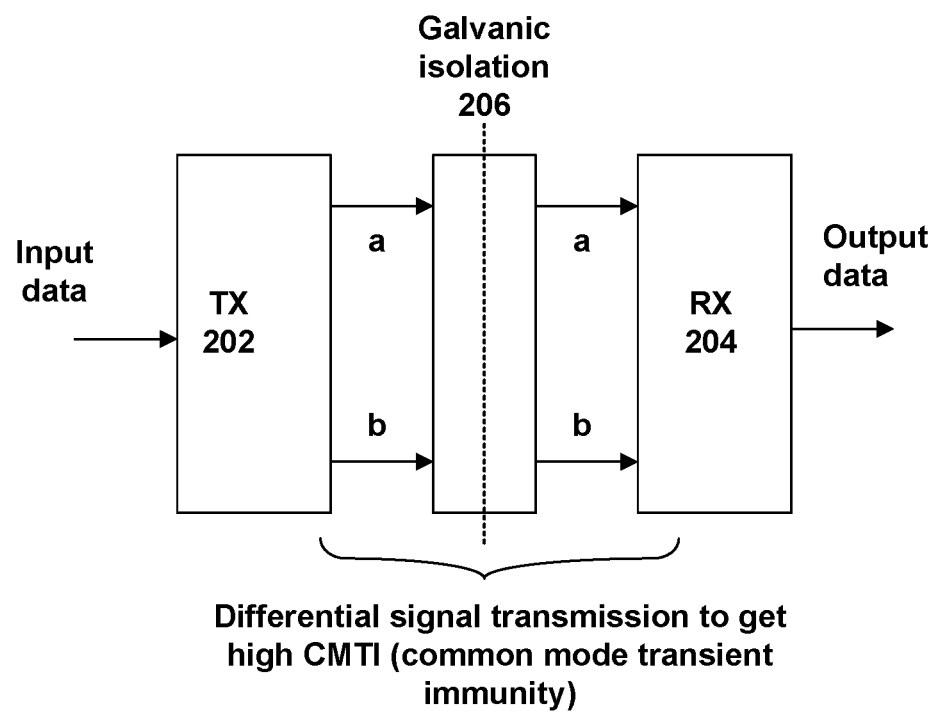
FIG. 2 is a block diagram showing galvanic isolation between a receiver circuit and a transmitter circuit.

FIG. 2 is a block diagram showing galvanic isolation between a receiver circuit and a transmitter circuit. As examples, transmitter circuit (TX) 202 may correspond to first circuit 102A, 102B, 102C of FIGS. 1A, 1B, 1C, and receiver circuit (RX) 204 may correspond to second circuit 112A, 112B, 112C of FIGS. 1A, 1B, 1C. As shown, a galvanic isolation barrier 206 exists between TX 202 and RX 204. The signal paths of "a" and "b" shown in FIG. 2 correspond to a differential signal, which is desirable to achieve high common mode transient immunity (CMTI). TX 202 and RX 204 may reside within a circuit package. Moreover, according to this disclosure, TX 202 and RX 204 may communicate using two different communication protocols, e.g., OOK and pulse coding.

Figure 3:
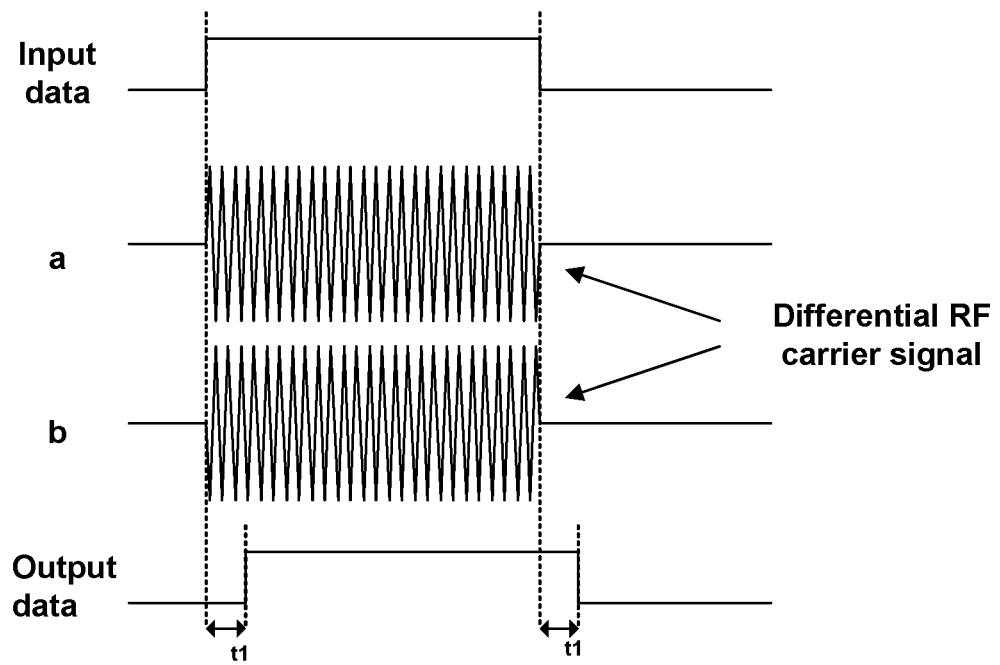
FIG. 3 is a set of graphs showing differential ON-OFF shift Keying (OOK) consistent with this disclosure.

FIG. 3 is a set of graphs showing differential OOK, consistent with this disclosure. Consistent with FIG. 3, OOK refers to a form of amplitude-shift keying (ASK) modulation that represents digital data (e.g., the input data shown FIG. 3) as the presence or absence of a carrier wave (e.g., shown as "a" and "b" in FIG. 3). With differential OOK, the carrier wave "a" may be phase shifted relative to carrier wave "b." The differential carrier wave data (e.g., a and b in FIG. 3) can be sent from TX 202 and received by RX 204 and then decoded to generate the output data shown in FIG. 3. The output data may represent a binary bit similar to the input data, with time t1 representing the delay time needed, e.g., by an envelope detector, to reconstruct the data based on the differential carrier wave data (e.g., a and b in FIG. 3).

Figure 4:
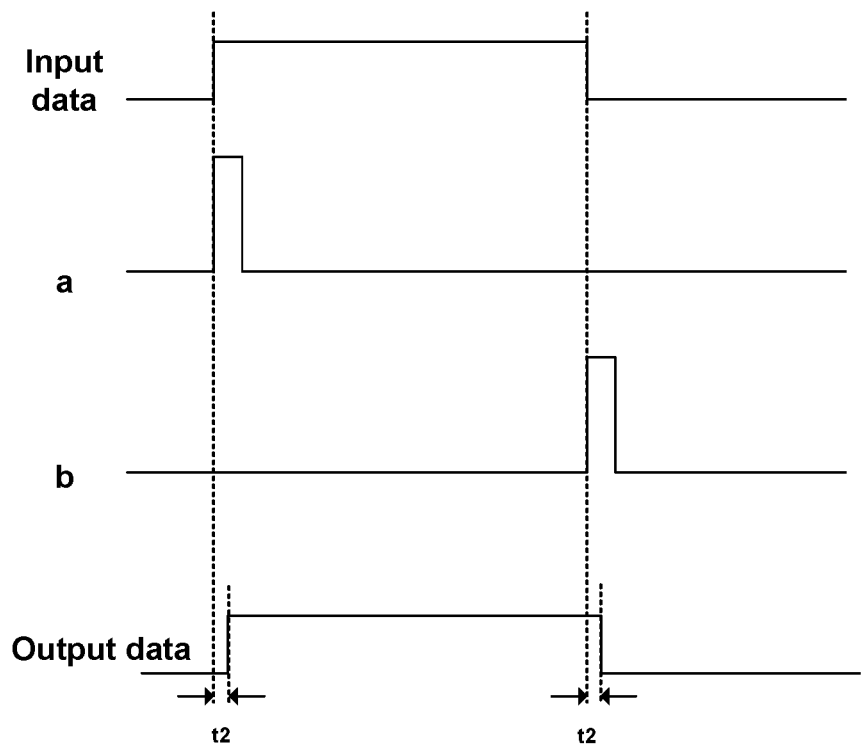
FIG. 4 is a set of graphs showing differential pulse coding consistent with this disclosure.

FIG. 4 is a set of graphs showing differential pulse coding consistent with this disclosure. With differential pulse coding, i.e., pulse coding over a differential communication channel, input data is represented by coding a first pulse (e.g., "a" shown in FIG. 4) on a first channel and then coding a second pulse (e.g., "b" shown in FIG. 4) on a second channel. The output data may represent the time delay between the first pulse and the second pulse), and the output data may comprise a binary bit similar to the input data, with time t2 representing the delay time needed (e.g., delay time by an amplitude detector and any additional latching time needed) to reconstruct the data based on pulses (e.g., a and b in FIG. 4).

According to this disclosure, the two different modulation schemes shown in FIGS. 3 and 4 are used at the same time within a circuit package in parallel, which can increase the amount of data which can be send over a galvanic isolation barrier using differential signal transmission. Moreover, some data (e.g., more data intensive items) may be better suited to pulse coding and some data (e.g., data that requires higher integrity) may be better suited to OOK.

Figure 5:
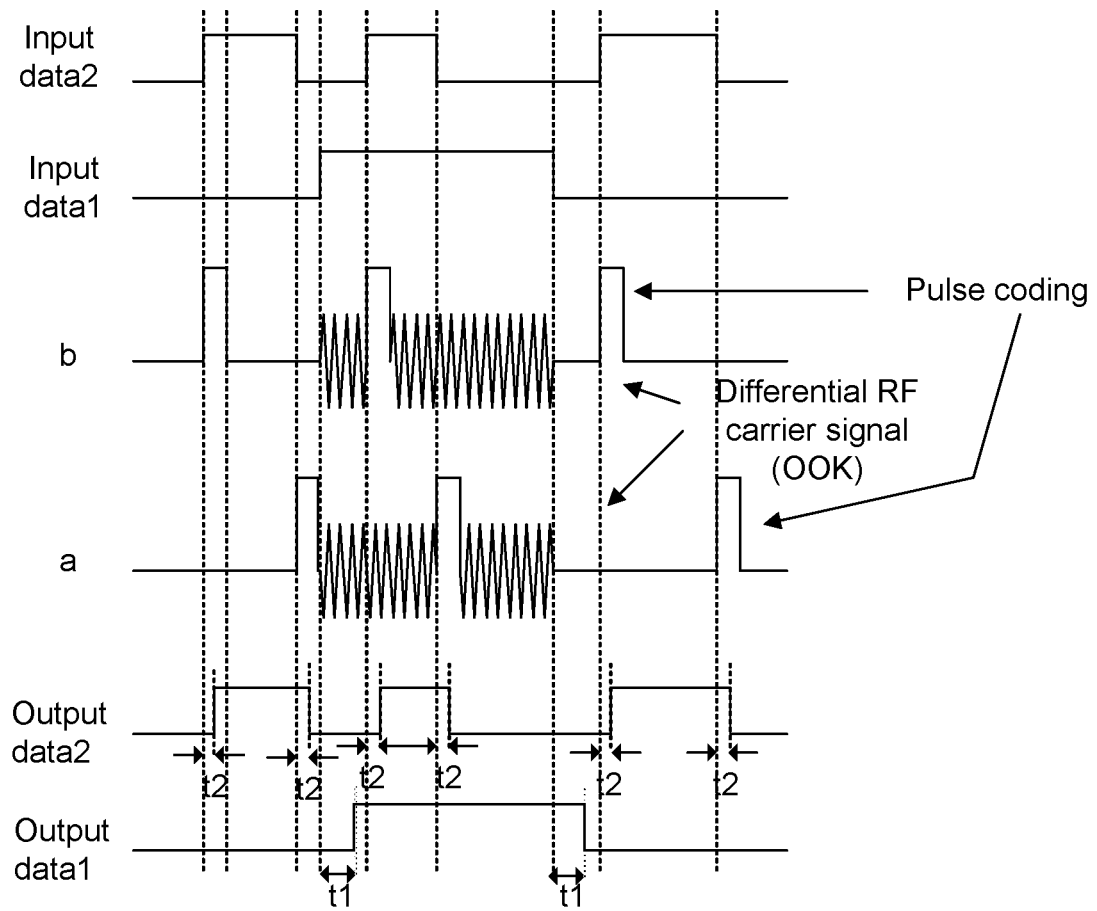
FIG. 5 is a set of graphs showing a combination of differential OOK and differential pulse coding consistent with this disclosure.

FIG. 5 is a set of graphs showing a combination of differential OOK and differential pulse coding consistent with this disclosure. In this example, both input data 1 and input data 2 is coded in parallel. In particular, input data 1 is coded with differential OOK and input data 2 is coded with differential pulse coding. Graphs "b" and "a" shown in FIG. 5 show pulses and differential carrier signals being combined in each channel of the differential communication.

Output data 2 is reconstructed on the receiver side based on differences in time between pulses coded in the first channel relative to the second channel (e.g., shown in graphs "b" and "a" of FIG. 5. Output data 1 is reconstructed on the receiver side based on the time envelope defined by the differential carrier waves coded on both the first channel and the second channel. The output data (output data 1 and output data 2) has slight delay relative to the input data. Time t1 shown in FIG. 5 is the delay time of an envelope detector to reconstruct output data 1 from the differential carrier waves coded on both the first channel and the second channel. Time t2 shown in FIG. 5 is the delay time needed to reconstruct output data 2 (e.g., delay time by an amplitude detector and any additional latching time needed) to reconstruct the data based on pulses coded in the first and second channels.

In some examples, in order to facilitate or improve the ability to decode the two different types of data in parallel, the differential pulse coding may define pulses with amplitudes that are greater than the differential carrier signal such that an amplitude detector can detect the pulses in the presence of the differential carrier signal. Moreover, a pulse length of the pulses may be less than a detection time associate with an envelope detector, such that the envelope detector can detect the differential carrier signal in the presence of the pulses associated with the differential pulse coding.

FIGS. 6-9 are block diagrams showing some example circuits configured to communicate across a galvanic isolation barrier consistent with this disclosure.

Figure 6:
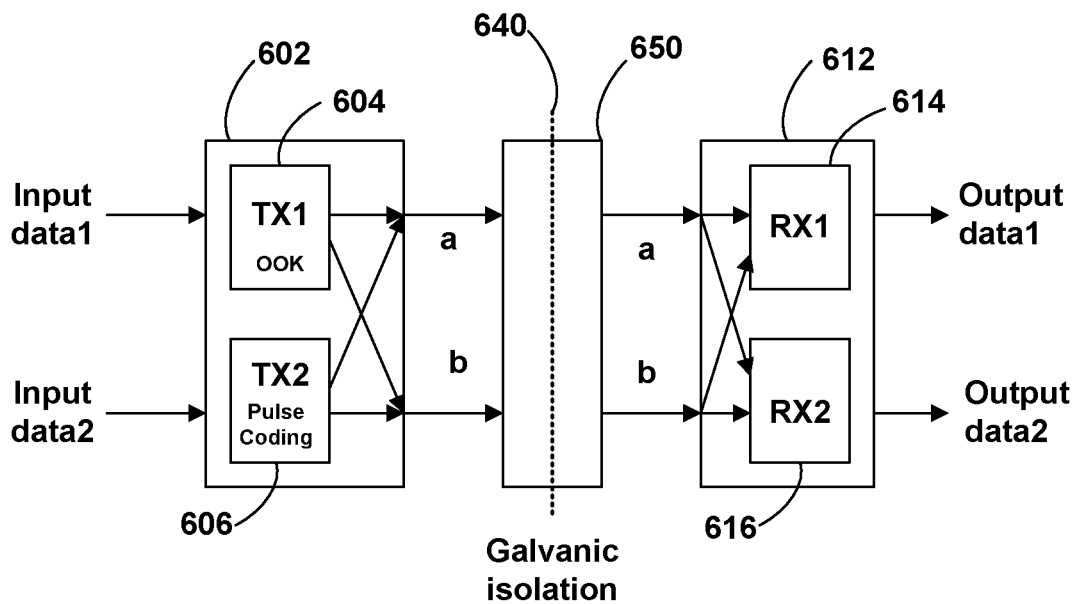
FIGS. 6-9 are block diagrams showing circuits configured to communicate across a galvanic isolation barrier consistent with this disclosure.

FIG. 6 shows one example of a device (e.g., a circuit package) arranged to include a galvanic isolation barrier 640 between a first voltage domain (on the left side of 640) and a second voltage domain (on the right side of 640). The device shown in FIG. 6 may comprise a first circuit 602 configured to operate in the first voltage domain, and a second circuit 612 configured to operate the second voltage domain. Isolation elements 650 are configured to define galvanic isolation barrier 640 between a first voltage domain and a second voltage domain. Moreover, isolation elements 650 define a differential communication channel for communicating the signals "a" and "b" shown in FIG. 6. The differential communication channel is configured to communicate data between first circuit 602 and second circuit 612 across galvanic isolation barrier 640. Moreover, first circuit 602 and second circuit 612 are configured to code the data across the differential communication channel using a first coding technique and a second coding technique, wherein the first coding technique comprises OOK with a differential carrier signal, and wherein the second coding technique comprises differential pulse coding.

In the example shown in FIG. 6, first circuit 602 includes a first transmitter (TX1) 604 and a second transmitter (TX2) 606. TX1 604 is configured to perform OOK encoding and TX2 606 is configured to perform pulse encoding. Second circuit 612 includes a first receiver (RX1) 614 and a second receiver (RX2) 616. RX1 614 is configured to perform OOK decoding and RX2 616 is configured to perform pulse decoding. The device of FIG. 6 may facilitate one way communication that has improved bandwidth for communication between circuits, relative to conventional device packages.

Figure 7:
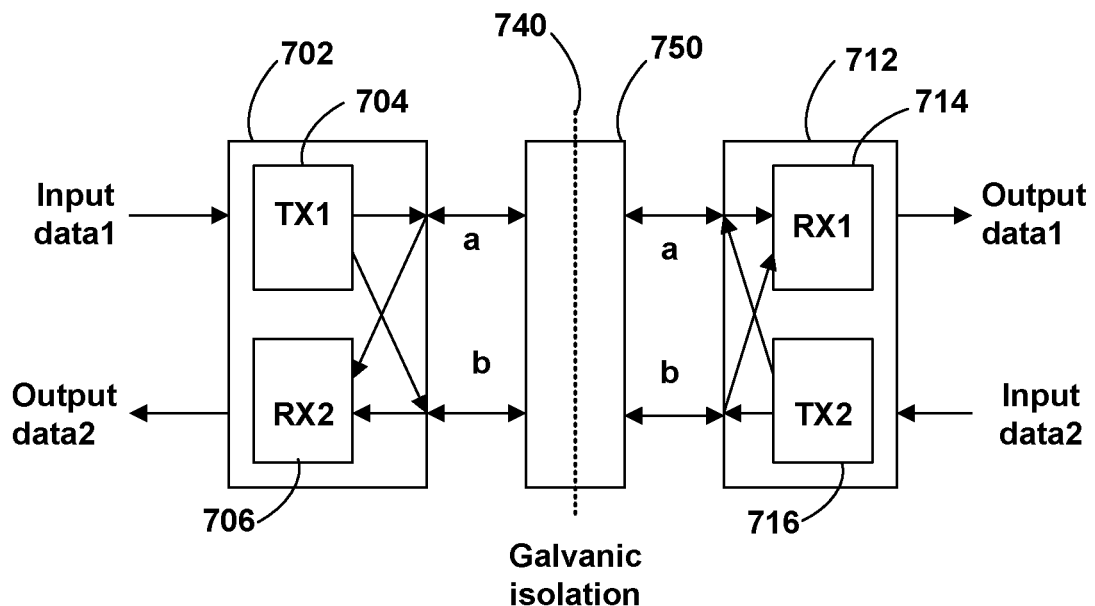

FIG. 7 shows one example of a device (e.g., a circuit package) arranged to include a galvanic isolation barrier 740 between a first voltage domain (on the left side of 740) and a second voltage domain (on the right side of 740). The device shown in FIG. 7 may comprise a first circuit 702 configured to operate in the first voltage domain, and a second circuit 712 configured to operate the second voltage domain. Isolation elements 750 are configured to define galvanic isolation barrier 740 between a first voltage domain and a second voltage domain. Moreover, isolation elements 750 define a differential communication channel for communicating the signals "a" and "b" shown in FIG. 7. The differential communication channel is configured to communicate data between first circuit 702 and second circuit 712 across galvanic isolation barrier 740. Moreover, first circuit 702 and second circuit 712 are configured to code the data across the differential communication channel using a first coding technique and a second coding technique, wherein the first coding technique comprises OOK with a differential carrier signal, and wherein the second coding technique comprises differential pulse coding.

In the example shown in FIG. 7, first circuit 702 includes a first transmitter (TX1) 704 and a first receiver (RX2) 706. TX1 704 is configured to perform OOK encoding and RX2 706 is configured to perform pulse decoding. Second circuit 612 includes a second receiver (RX1) 714 and a second transmitter (TX2) 716. RX1 714 is configured to perform OOK decoding and TX2 616 is configured to perform pulse encoding. The device of FIG. 7 may facilitate two-way communication over galvanic isolation barrier 740 within the device, with the higher-bandwidth pulse coding being used for communication from circuit 712 to circuit 702, and higher-reliability OOK coding for communication from circuit 702 to circuit 712. Of course, OOK and pulse coding directions could also be reversed such that the higher-bandwidth pulse coding could be used for communication from circuit 702 to circuit 712, and higher-reliability OOK coding could be used for communication from circuit 712 to circuit 702.

Figure 8:
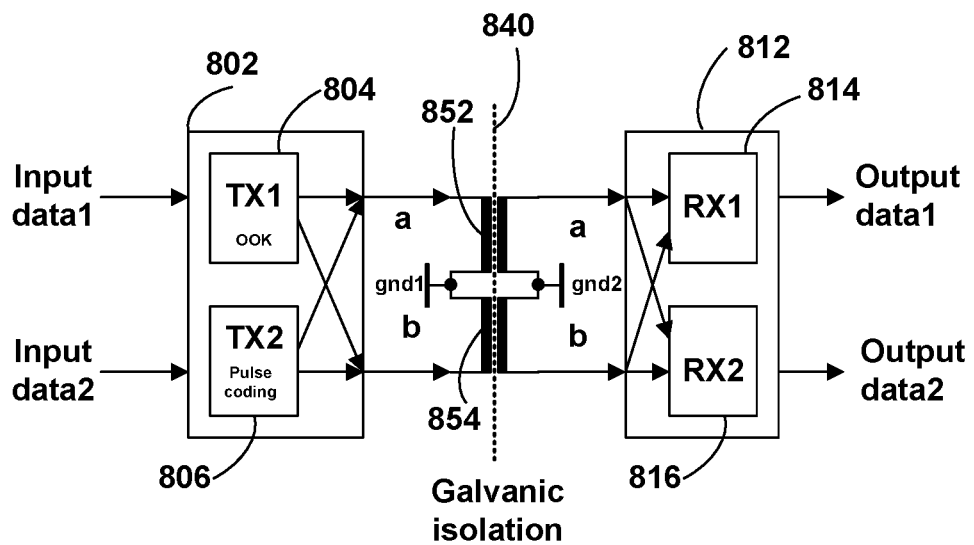

FIG. 8 shows one example of a device (e.g., a circuit package) arranged to include a galvanic isolation barrier 840 between a first voltage domain (on the left side of 840) and a second voltage domain (on the right side of 840). The device shown in FIG. 8 may comprise a first circuit 802 configured to operate in the first voltage domain, and a second circuit 812 configured to operate the second voltage domain. Isolation elements in the form of inductors 852, 854 are configured to define galvanic isolation barrier 840 between a first voltage domain and a second voltage domain. Moreover, inductors 852, 854 define a differential communication channel for communicating the signals "a" and "b" shown in FIG. 8. In some examples, inductors 852, 854 may comprise so-called coreless transformers.

The differential communication channel is configured to communicate data between first circuit 802 and second circuit 812 across galvanic isolation barrier 840. Moreover, first circuit 802 and second circuit 812 are configured to code the data across the differential communication channel using a first coding technique and a second coding technique, wherein the first coding technique comprises OOK with a differential carrier signal, and wherein the second coding technique comprises differential pulse coding.

Like FIG. 6, in the example shown in FIG. 8, first circuit 802 includes a first transmitter (TX1) 804 and a second transmitter (TX2) 806. TX1 804 is configured to perform OOK encoding and TX2 806 is configured to perform pulse encoding. Second circuit 812 includes a first receiver (RX1) 814 and a second receiver (RX2) 816. RX1 814 is configured to perform OOK decoding and RX2 816 is configured to perform pulse decoding. The device of FIG. 8 may facilitate one way communication that has improved bandwidth for communication between circuits, relative to conventional device packages.

Figure 9:
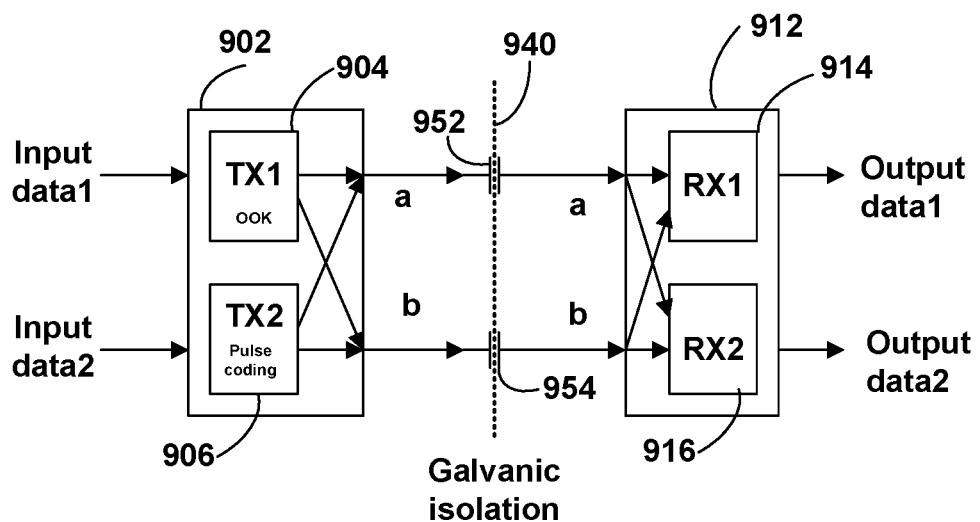

FIG. 9 shows one example of a device (e.g., a circuit package) arranged to include a galvanic isolation barrier 940 between a first voltage domain (on the left side of 940) and a second voltage domain (on the right side of 940). The device shown in FIG. 9 may comprise a first circuit 902 configured to operate in the first voltage domain, and a second circuit 912 configured to operate the second voltage domain. Isolation elements in the form of capacitors 952, 954 are configured to define galvanic isolation barrier 940 between a first voltage domain and a second voltage domain. Moreover, capacitors 952, 954 define a differential communication channel for communicating the signals "a" and "b" shown in FIG. 9.

The differential communication channel is configured to communicate data between first circuit 902 and second circuit 912 across galvanic isolation barrier 940. Moreover, first circuit 902 and second circuit 912 are configured to code the data across the differential communication channel using a first coding technique and a second coding technique, wherein the first coding technique comprises OOK with a differential carrier signal, and wherein the second coding technique comprises differential pulse coding.

Like FIG. 6, in the example shown in FIG. 9, first circuit 902 includes a first transmitter (TX1) 904 and a second transmitter (TX2) 906. TX1 904 is configured to perform OOK encoding and TX2 906 is configured to perform pulse encoding. Second circuit 912 includes a first receiver (RX1) 914 and a second receiver (RX2) 916. RX1 914 is configured to perform OOK decoding and RX2 916 is configured to perform pulse decoding. The device of FIG. 9 may facilitate one way communication that has improved bandwidth for communication between circuits, relative to conventional device packages.

In some examples, the inductors 852, 854 of FIG. 8 could be used for isolation elements 750 of FIG. 7. In some examples, the inductors 852, 854 of FIG. 8 could be used for isolation elements 650 of FIG. 6. In some examples, the capacitors 952, 954 of FIG. 9 could be used for isolation elements 750 of FIG. 7. In some examples, the capacitors 952, 954 of FIG. 9 could be used for isolation elements 650 of FIG. 6.

Consistent with FIGS. 6, 8, and 9, a first circuit 602, 802, 902 may include a first transmitter (TX1) 604, 804, 904 configured to encode first information using the first coding technique and a second transmitter (TX2) 606, 806, 906 configured to encode second information using the second coding technique. A second circuit 612, 812, 912 may include a first receiver (RX1) 614, 814, 914 configured to decode the first information using the first coding technique and a second receiver (RX2) 616, 816, 916 configured to decode the second information using the second coding technique.

Consistent with FIG. 7, a first circuit 702 may include a first transmitter TX1 704 configured to encode first information using the first coding technique and a first receiver RX2 706 configured to decode second information using the second coding technique. A second circuit 712 includes a second transmitter TX2 716 configured to encode the second information using the second coding technique and a second receiver RX1 714 configured to decode the first information using the first coding technique.

Figure 10:
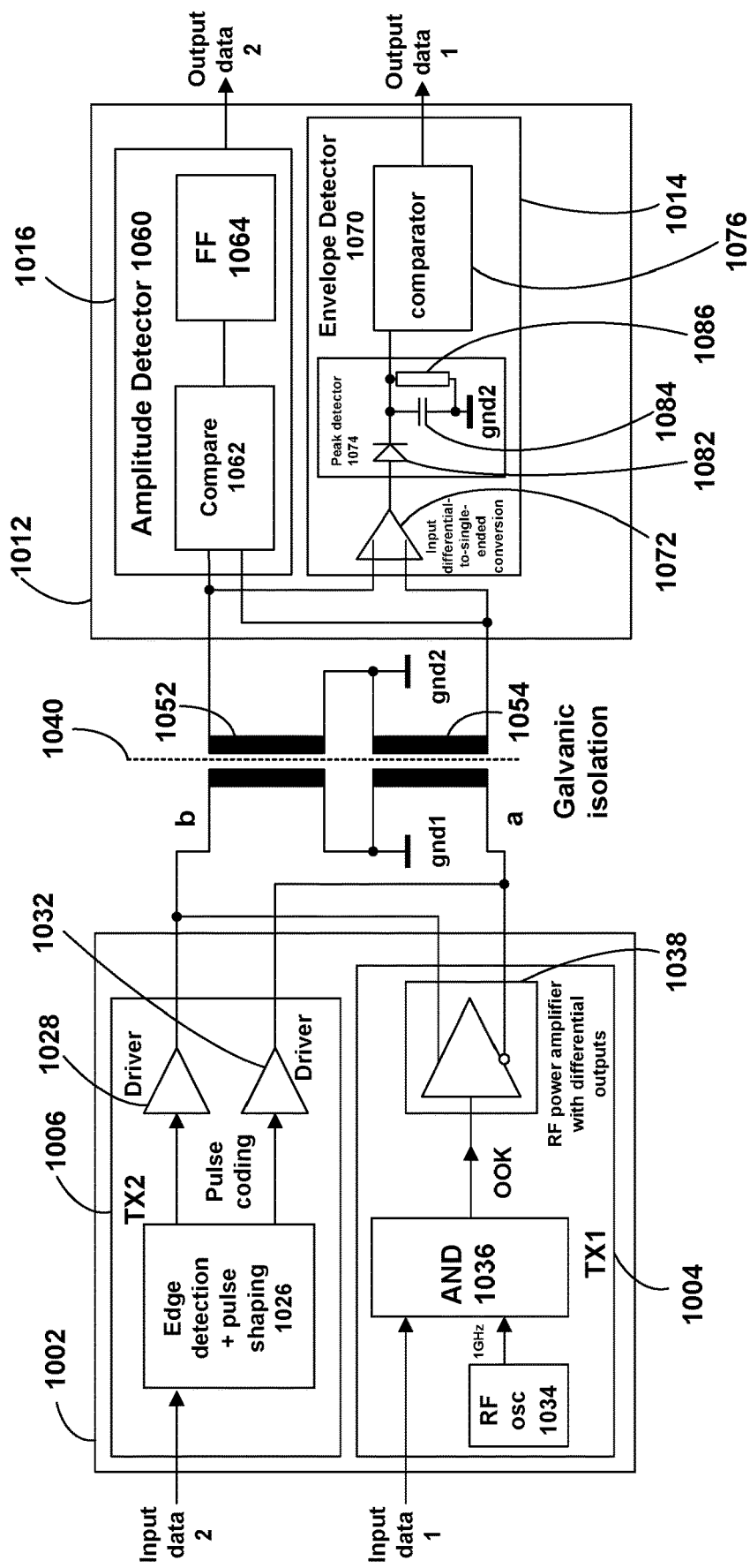
FIG. 10 is a more detailed block diagram showing an example of circuits configured to communicate across a galvanic isolation barrier consistent with this disclosure.

FIG. 10 shows one example of a device (e.g., a circuit package) arranged to include a galvanic isolation barrier 1040 between a first voltage domain (on the left side of 1040) and a second voltage domain (on the right side of 1040). The device shown in FIG. 10 may comprise a first circuit 1002 configured to operate in the first voltage domain, and a second circuit 1012 configured to operate the second voltage domain. Isolation elements in the form of inductors 1052, 1054 are configured to define galvanic isolation barrier 1040 between a first voltage domain and a second voltage domain. Moreover, inductors 1052, 1054 define a differential communication channel for communicating the signals "a" and "b" shown in FIG. 10. In some examples, inductors 1052, 1054 may comprise so-called coreless transformers.

The differential communication channel is configured to communicate data between first circuit 1002 and second circuit 1012 across galvanic isolation barrier 1040. Moreover, first circuit 1002 and second circuit 1012 are configured to code the data across the differential communication channel using a first coding technique and a second coding technique, wherein the first coding technique comprises OOK with a differential carrier signal, and wherein the second coding technique comprises differential pulse coding.

Like some other examples above, in the example shown in FIG. 10, first circuit 1002 includes a first transmitter (TX1) 1004 and a second transmitter (TX2) 1006. TX1 1004 is configured to perform OOK encoding and TX2 1006 is configured to perform pulse encoding. Second circuit 1012 includes a first receiver 1014 and a second receiver 1016. First receiver 1014 is configured to perform OOK decoding and second receiver 1016 is configured to perform pulse decoding. The device of FIG. 10 may facilitate one way communication that has improved bandwidth for communication between circuits, relative to conventional device packages.

Figure 11:
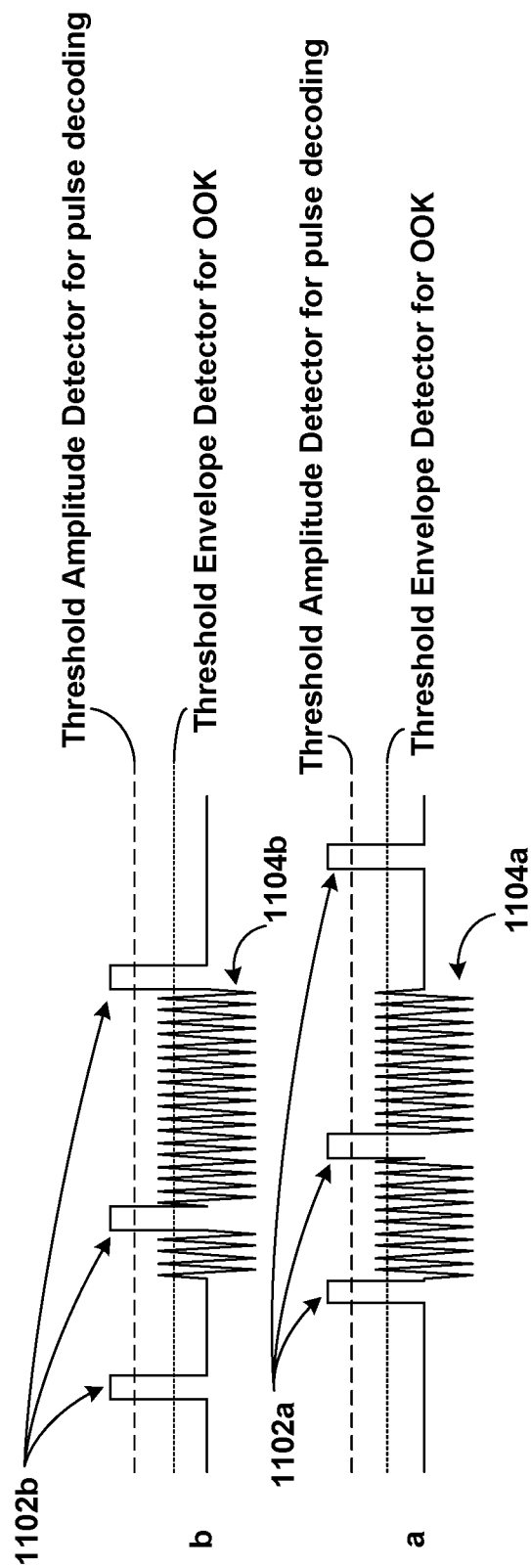
FIG. 11 is a set of graphs showing OOK in combination with pulse coding consistent with this disclosure.

FIG. 11 is a set of graphs showing OOK in combination with pulse coding consistent with this disclosure. The OOK data may comprise first data 1104a, 1104b coded in a differential carrier signal and second the pulse coding data may comprise second data 1102a, 1102b coded in the differential pulse coding. The differential coding channel is shown by the separate graphs of "a" and "b" shown in FIG. 11 whereby signal "a" of FIG. 11 includes a portion of first data 1104a and a portion of second data 1102a and signal "b" of FIG. 11 includes a portion of first data 1104b and a portion of second data 1102b.

Referring again to FIG. 10, in order to encode first data 1104a, 1104b as shown in FIG. 11, TX1 1004 may comprise an RF oscillator 1034 configured to generate a carrier signal. TX1 1004 may also comprise an AND circuit 1036 configured to receive input data 1 and encode input data 1 on the carrier frequency. For example, input data 1 may define a pulse length and that pulse length can be combined with the carrier frequency by AND circuit 1036 to generate a carrier wave having the duration of the pulse for the pulse length defined by the input data 1 to generate first data 1104a, 1104b shown in FIG. 11.

In order to encode second data 1102a, 1102b as shown in FIG. 11, TX2 1006 may comprise an edge detection+pulse shaping unit 1026 configured to receive input data 2. Unit 1026 generates the short pulses at the defined times defined by input data 2, and drivers 1028, 1032 amplify the short pulses to generate second data 1102a, 1102b shown in FIG. 11.

Signals "a" and "b" shown in FIG. 10 may correspond to signals "a" and "b" shown in FIG. 11. Inductors 1052, 1054 define a differential communication channel for communicating the signals "a" and "b" shown in FIG. 10.

On the receiver side, second circuit 1012 includes a first receiver 1014 and a second receiver 1016. First receiver 1014 is configured to perform OOK decoding and second receiver 1016 is configured to perform pulse decoding. Second receiver 1016 may comprise an amplitude detector 1060 for detecting first data 1102a, 1102b. First data 1102a, 1102b may comprise pulses associated with the differential pulse coding. Amplitude detector 1060 may comprise a compare unit 1062 and a memory circuit (e.g., flip flop 1064) to latch any pulse identified by compare unit 1062. In some examples, the differential pulse coding defines the pulses with amplitudes that are greater than the differential carrier signal such that amplitude detector 1060 can detect the pulses in the presence of the differential carrier signal. In other words, amplitude detector 1060 can identify data 1102a, 1102b in the presence of data 1104a, 1104b because the amplitudes of data 1102a, 1102b are greater than the amplitudes of the differential carrier signal of data 1104a, 1104b. Compare unit 1062, for example, may be configured to identify pulses by comparing data amplitudes to a threshold defined based on the amplitude of the differential carrier.

First receiver 1014 may comprise an envelope detector 1070 for detecting the differential carrier signal. The detection time associated with envelope detector 1070 is configured relative to the pulse length of pulse coded data to ensure that the envelope detector can detect the differential carrier signal in the presence of the pulses associated with the differential pulse coding. In other words, pulse length of the pulses in data 1102a, 1102b is less than a detection time associate with the envelope detector such that the envelope detector can detect the differential carrier signal in data 1104a, 1104b in the presence of the pulses associated with the differential pulse coding in data 1102a, 1102b.

In some examples, envelope detector 1070 may include a differential-to-single-ended conversion unit 1072 configured to convert the received differential signal to a single ended signal. Envelope detector 1070 may further include a peak detector 1074 configured to identify peaks of the carrier signal. For example, peak detector 1074 may comprise a diode 1082 connected to an RC circuit. Peak detector 1074 is configured to operate as a filter with integrating behavior. The RC circuit may comprise capacitor 1084 and resistor 1086 in series between a ground voltage and the output of diode 1082. Comparator 1076 identifies the carrier signal by comparing the output signal of peak detector 1074 to a threshold that is based on the expected voltage amplitude of the carrier signal. In some examples according to this disclosure, the pulse length for the pulse coding are shorter (e.g., on the order of 2 nanoseconds), relative detection time of envelop detector 1070, which can help to ensure that the signals for the two different modulation schemes can be separated and identified by second circuit 1012. Second circuit 1012 is configured to the output data 1 (OOK data) and output data 2 (pulse coded data). Output data 1 corresponds to the input data 1 that is coded in OOK and output data 2 corresponds to the input data 2 that is pulse coded.

In some examples, the techniques and circuits of this disclosure may be used in a high voltage gate driver, where input data from a low voltage microcontroller or processor side is communicated over a galvanic isolation barrier to a high voltage domain on a power side and vice versa.

Figure 12:
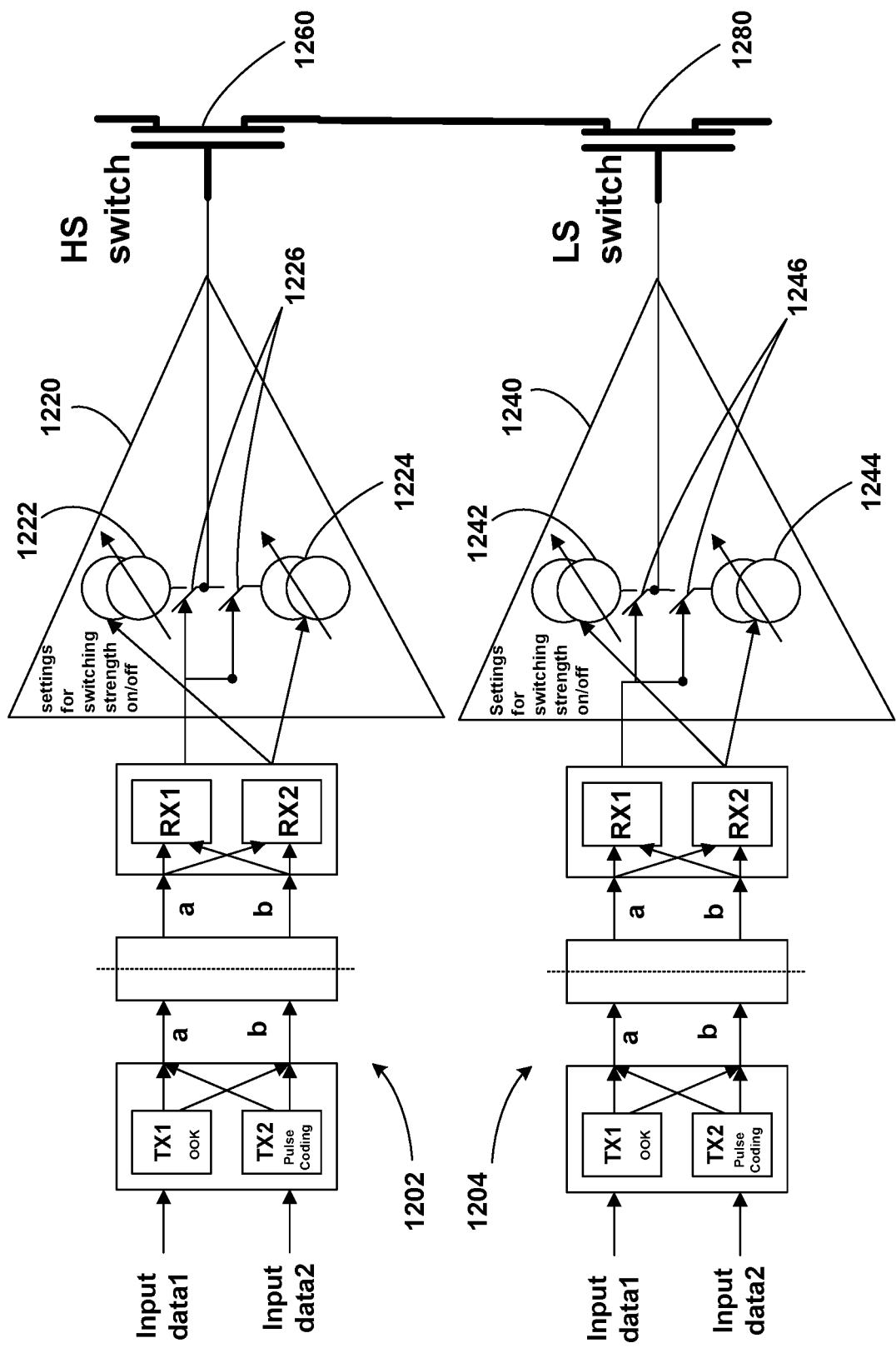
FIG. 12 is a diagram showing system that includes high-side and low-side drivers according to an example of this disclosure, and high-side and low-side switches arranged in a half bridge.

FIG. 12 is a diagram showing a system that includes a high-side driver 1220 and a low-side driver 1240 according to an example of this disclosure, and a high-side power switch 1260 and low-side power switch 1280 arranged in a half bridge. High-side power switch 1260 and low-side power switch 1280, for example, may comprise any type of field-effect transistor (FET) including any one or combination of a metal-oxide-semiconductor field-effect transistor (MOSFET), a bipolar junction transistor (BJT), an insulated-gate bipolar transistor (IGBT), a junction field effect transistor (JFET), a high electron mobility transistor (HEMT), or other kinds of elements that use voltage or current for control.

Power switches 1260, 1280 may be formed in various material compounds, such as Silicon, Silicon Carbide, Gallium Nitride, or any other combination of one or more semiconductor materials. In some examples, silicon carbide switches may experience lower switching power losses. Improvements in magnetics and faster switching, such as Gallium Nitride switches, may allow a power transistor to draw short bursts of current. These higher frequency devices may require control signals (e.g., voltage signals delivered to the control terminal of the power transistor) to be sent with more precise timing, as compared to lower-frequency devices.

The system shown in FIG. 12 includes a first device 1202 (i.e., a first circuit package) and a second device 1204 (i.e., a second circuit package). First device 1202 and second device 1204 may each correspond to any of the devices shown and described above, such as those shown and described in FIGS. 1A-1C, or any of FIGS. 6-10. The details of first device 1202 and second device 1204 are not repeated again here but are described above.

As shown in FIG. 12, first device 1202 is configured to communicate data to a high-side driver 1220 and second device 1204 is configured to communicate data to a low-side driver 1240. In this case, OOK coded data may be better suited for first type of data for drivers 1220, 1240 and pulse coded data may be better suited for a second type of data for drivers 1220, 1240.

Drivers 1220, 1240 each comprise current sources 1222, 1224, 1242, 1244. Drivers 1220, 1240 also comprise control switches 1226, 1246. More specifically, high-side driver 1220 includes current sources 1222, 1224 and control switches 1226, and low-side driver 1240 includes current sources 1242, 1244 and control switches 1246. In some examples, first device 1202 is configured to communicate a switching signal to switches 1226 for controlling the gate of high-side switch 1260. Similarly, second device 1204 is configured to communicate a switching signal to switches 1246 for controlling the gate of low-side switch 1280. It is desirable for the switching signals to be robust with a relatively low error rate, and therefore, OOK is well suited for first device 1202 to control switches 1226 and for second device 1204 to control switches 1246. RX1 of device 1202 may be configured to output the OOK signals to control switches 1226, and RX1 of device 1204 may be configured to output the OOK signals to control switches 1226.

In some situations, it is desirable to control or adjust settings of current sources 1222, 1224 and current sources 1242, 1244, such as settings for switching strength on/off of driver 1220 and driver 1240 or other settings. Current sources 1222, 1224 and current sources 1242, 1244, for example may be configurable in terms of current or voltage levels used. Setting changes, however, do not necessarily require the robustness that is needed for controlling switches 1226, 1246. A few cycle delay in adjusting settings of current sources 1222, 1224 and current sources 1242, 1244, e.g., due to an error signal or other issue, may be acceptable. Moreover, setting changes may require more bandwidth (e.g., more data) than the signals for controlling switches 1226, 1246. Pulse coded data is well suited for first device 1202 to control or adjust settings of current sources 1222, 1224 and for second device 1204 to control or adjust settings of current sources 1242, 1244. RX2 of device 1202 may be configured to output the pulse coded signals to control or adjust settings of current sources 1222, 1224, and RX2 of device 1204 may be configured to output the pulse coded signals to control or adjust settings of current sources 1242, 1244.

Accordingly, the first data (the OOK data) communicated by device 1202 may comprise a switching signal for controlling a high-side power switch 1260 via a high-side driver circuit 1220 operating in the second voltage domain, and the second data (the pulse coded data) may comprise configuration data for high-side driver circuit 1220 operating in the second voltage domain.

Similarly, the first data (the OOK data) communicated by device 1204 may comprise a switching signal for controlling a low-side power switch 1280 via a low-side driver circuit 1240 operating in the second voltage domain, and the second data (the pulse coded data) may comprise configuration data for low-side driver circuit 1240 operating in the second voltage domain.

Consistent with FIG. 12, in some examples, the first data (the OOK data) may be communicated from first device 1202 or second device 1204 when high-side power switch 1260 or a low-side power switch is in an ON state, wherein high-side power switch 1260 and low-side power switch 1280 are arranged in a half-bridge configuration, and wherein the second data (the pulse coded data) is communicated during dead time when both high-side power switch 1260 and low-side power switch 1280 are in an OFF state. An example of timing details of such signals is shown in FIG. 13.

Figure 13:
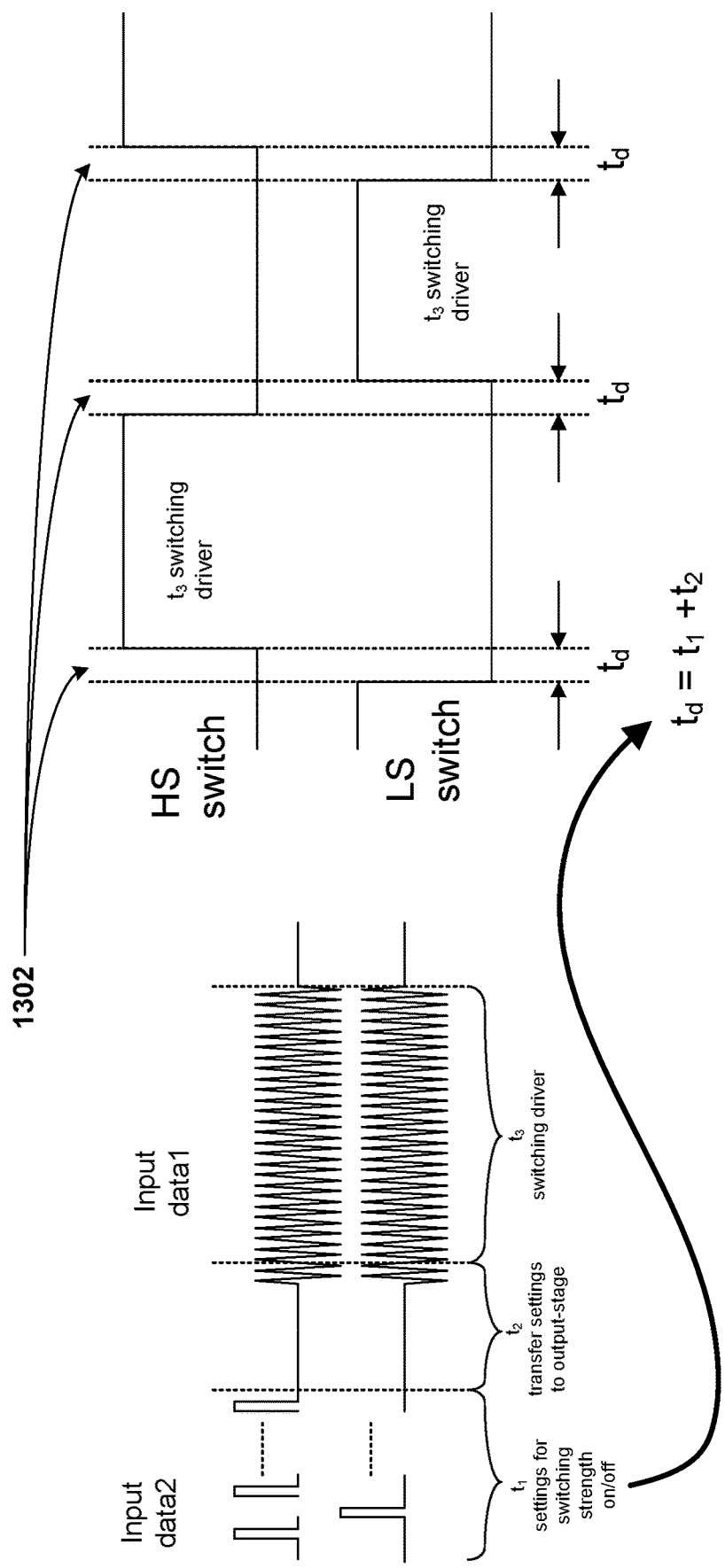
FIG. 13 is a set of graphs showing more details of a communication technique for the driver circuits of FIG. 12 consistent with this disclosure.

FIG. 13 is a set of graphs showing more details of a communication technique for the driver circuits of FIG. 12 consistent with this disclosure. In this example, input data 2 (e.g., pulse coded data) is communicated for a first time period ($t_1$) during dead time ($t_d$). The dead time ($t_d$) refers to a period of time in the switching cycles when both high-side power switch 1260 and low-side power switch 1280 are in an off state. The dead time ($t_d$) may be needed to prevent cross conduction in the half bridge. A second time period ($t_2$) may define enough time to transfer or implement the communicated settings to the output-stage (i.e., the time needed adjust settings of current sources 1222, 1224 of driver 1220 or the time needed to adjust settings of current sources 1242, 1244 of driver 1240). Thus, according to this example, the dead time "slots" 1302 can be used to configure the output strength of driver 1220 or driver 1240 using pulse coded data. The third period of time ($t_3$) can be used for sending switching signals to switches 1226 of driver 1220 or to switches 1246 of driver 1240 using OOK data.

Figure 14:
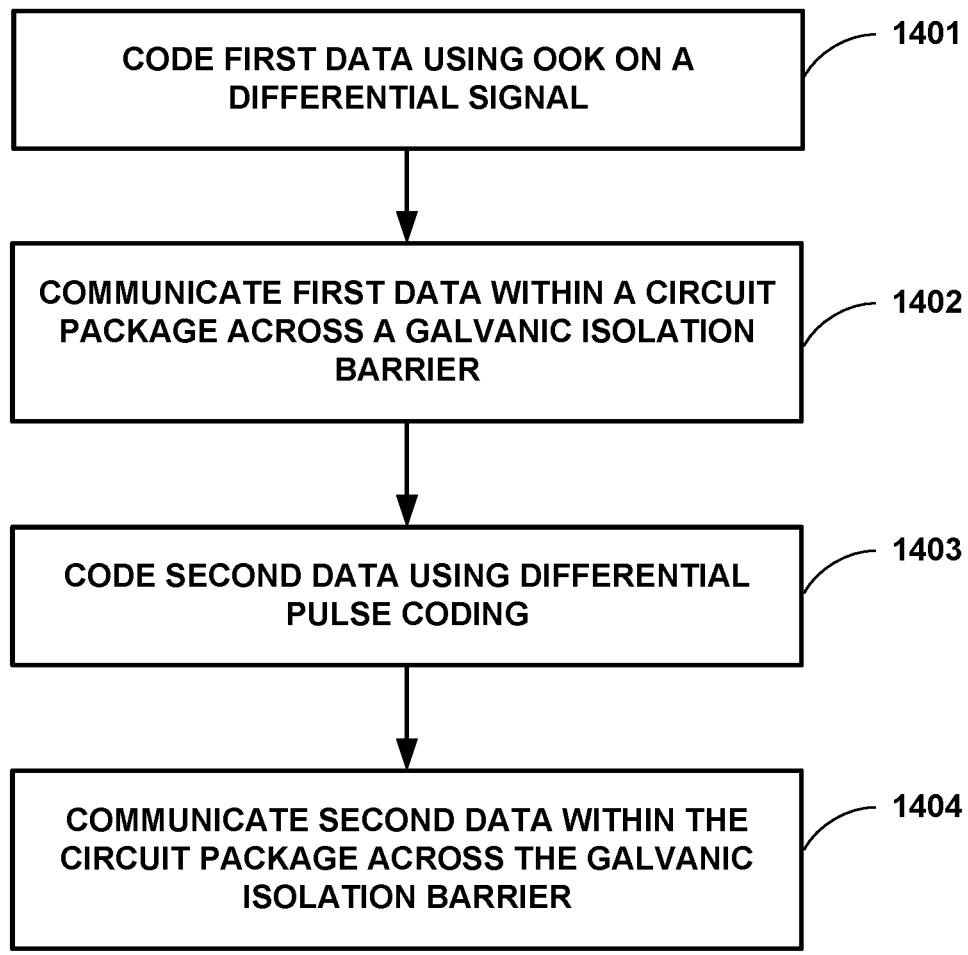
FIG. 14 is a flow diagram consistent with this disclosure.

FIG. 14 is a flow diagram consistent with this disclosure. As shown in FIG. 14, a first circuit 102A, 102B, 102C, 602, 702, 802, 902, 1002 is configured to code (e.g., encode) first data using OOK on a differential signal (1401). First circuit 102A, 102B, 102C, 602, 702, 802, 902, 1002 is configured to communicate the first data within a circuit package 100A, 100B, 100C, FIG. 6, FIG. 7, FIG. 8, FIG. 9, FIG. 10 across a galvanic isolation barrier within the circuit package (1402). First circuit 102A, 102B, 102C, 602, 702, 802, 902, 1002 is further configured to code (e.g., encode) second data using differential pulse coding (1403). First circuit 102A, 102B, 102C, 602, 702, 802, 902, 1002 is configured to communicate the second data within a circuit package 100A, 100B, 100C, FIG. 6, FIG. 7, FIG. 8, FIG. 9, FIG. 10 across a galvanic isolation barrier within the circuit package (1404). Second circuit 112A, 112B, 112C, 612, 712, 812, 912, 1012 is configured to receive the communicated data within the circuit package 100A, 100B, 100C, FIG. 6, FIG. 7, FIG. 8, FIG. 9, FIG. 10. The data may be decoded on the receive side so that the data can be used appropriately.

The techniques described in this disclosure may be implemented, at least in part, in circuitry, hardware, software, firmware or any combination thereof. Such hardware, software, and firmware may be implemented within the same device or within separate devices to support the various operations and functions described in this disclosure. In addition, any of the described units, modules or components may be implemented together or separately as discrete but interoperable circuits or devices. Depiction of different features as modules or units is intended to highlight different functional aspects and does not necessarily imply that such modules or units must be realized by separate components. Rather, functionality associated with one or more modules or units may be performed by separate components or circuits or integrated within common components or circuits. It may also be possible for one or more aspects of this disclosure to be performed in software, in which case those aspects of the techniques described in this disclosure may also be embodied or encoded in a computer-readable medium.

The following numbered aspects demonstrate one or more aspects of the disclosure.

Clause 1—A device arranged to include a galvanic isolation barrier between a first voltage domain and a second voltage domain, the device comprising: a first circuit configured to operate in the first voltage domain; a second circuit configured to operate the second voltage domain; one or more isolation elements configured to define the galvanic isolation barrier between the first voltage domain and the second voltage domain; and a differential communication channel configured to communicate data between the first circuit and the second circuit across the galvanic isolation barrier, wherein the first circuit and the second circuit are configured to code the data across the differential communication channel using a first coding technique and a second coding technique, wherein the first coding technique comprises OOK with a differential carrier signal, and wherein the second coding technique comprises differential pulse coding.

Clause 2—The device of clause 1, wherein the first circuit and the second circuit are formed on different circuit dies and the device includes a molding compound formed around the different circuit dies.

Clause 3—The device of clause 1, wherein the first circuit and the second circuit are formed on a same circuit die during a semiconductor manufacturing process with a trench formed in the circuit die to isolate the first voltage domain from the second voltage domain, and wherein the device includes a molding compound formed around the circuit die.

Clause 4—The device of any of clauses 1-3, wherein the one or more isolation elements comprise a coreless transformer that galvanically isolates the first voltage domain and the second voltage domain.

Clause 5—The device of any of clauses 1-3, wherein the one or more isolation elements comprise one or more capacitors that galvanically isolates the first voltage domain and the second voltage domain.

Clause 6—The device of any of clauses 1-5, wherein the first circuit includes a first transmitter configured to encode first information using the first coding technique and a second transmitter configured to encode second information using the second coding technique, and wherein the second circuit includes a first receiver configured to decode the first information using the first coding technique and a second receiver configured to decode the second information using the second coding technique.

Clause 7—The device of any of clauses 1-5, wherein the first circuit includes a first transmitter configured to encode first information using the first coding technique and a first receiver configured to decode second information using the second coding technique, and wherein the second circuit includes a second transmitter configured to encode the second information using the second coding technique and a second receiver configured to decode the first information using the first coding technique.

Clause 8—The device of any of clauses 1-7, further comprising: an amplitude detector for detecting pulses associated with the differential pulse coding, wherein the differential pulse coding defines the pulses with amplitudes that are greater than the differential carrier signal such that the amplitude detector can detect the pulses in the presence of the differential carrier signal.

Clause 9—The device of any of clauses 1-8, further comprising: an envelope detector for detecting the differential carrier signal, wherein a pulse length of the pulses is less than a detection time associate with the envelope detector such that the envelope detector can detect the differential carrier signal in the presence of the pulses associated with the differential pulse coding.

Clause 10—The device of clause 8 and 9, wherein the second circuit includes the amplitude detector and the envelope detector.

Clause 11—The device of any of clauses 1-10, wherein the data comprises first data coded in the differential carrier signal and second data coded in the differential pulse coding.

Clause 12—The device of clause 11, wherein the first data comprises a switching signal for controlling a high-side power switch via a high-side driver circuit operating in the second voltage domain, and wherein the second data comprises configuration data for the high-side driver circuit operating in the second voltage domain.

Clause 13—The device of clause 12, wherein the first data is communicated when the high-side power switch or a low-side power switch is in an ON state, wherein the high-side power switch and the low-side power switch are arranged in a half-bridge configuration, and wherein the second data is communicated during dead time when both the high-side power switch and the low-side power switch are in an OFF state.

Clause 14—The device of any of clauses 1-13, wherein the device comprises a circuit package that includes a molding compound formed around the first circuit, the second circuit, the one or more isolation elements, and the differential communication channel.

Clause 15—A method comprising: communicating first data between a first circuit and a second circuit via a differential communication channel across a galvanic isolation barrier within a circuit package, wherein the first data is coded via a first coding technique that comprises OOK with a differential carrier signal; and communicating second data between the first circuit and the second circuit via the differential communication channel across the galvanic isolation barrier within the circuit package, wherein the second data is coded via a second coding technique comprises differential pulse coding.

Clause 16—The method of clause 15, further comprising: communicating the first data from the first circuit to the second circuit across the galvanic isolation barrier within the circuit package; and communicating the second data from the second circuit to the first circuit across the galvanic isolation barrier within the circuit package.

Clause 17—The method of clause 15, further comprising: communicating the first data from the first circuit to the second circuit across the galvanic isolation barrier within the circuit package; and communicating the second data from the first circuit to the second circuit across the galvanic isolation barrier within the circuit package.

Clause 18—The method of any of clauses 15-17, wherein the second circuit includes an amplitude detector for detecting pulses associated with the differential pulse coding, wherein the differential pulse coding defines the pulses with amplitudes that are greater than the differential carrier signal such that the amplitude detector can detect the pulses in the presence of the differential carrier signal.

Clause 19—The method of any of clauses 15-18, wherein the second circuit includes an envelope detector for detecting the differential carrier signal, wherein a pulse length of the pulses is less than a detection time associate with the envelope detector such that the envelope detector can detect the differential carrier signal in the presence of the pulses associated with the differential pulse coding.

Clause 20—The method of any of clauses 15-19, wherein the first data comprises a switching signal for controlling a high-side power switch via a high-side driver circuit operating in a second voltage domain that is different than a first voltage domain associated with the first circuit, and wherein the second data comprises configuration data for the high-side driver circuit operating in the second voltage domain.

Clause 21—The method of clause 20, wherein the first data is communicated when the high-side power switch or a low-side power switch is in an ON state, wherein the high-side power switch and the low-side power switch are arranged in a half-bridge configuration, and wherein the second data is communicated during dead time when both the high-side power switch and the low-side power switch are in an OFF state.

Various examples of the disclosure have been described. Any combination of the described systems, operations, or functions is contemplated. These and other examples are within the scope of the following claims.

What is claimed is:

1. A device arranged to include a galvanic isolation barrier between a first voltage domain and a second voltage domain, the device comprising:
   a first circuit configured to operate in the first voltage domain;
   a second circuit configured to operate the second voltage domain;
   one or more isolation elements configured to define the galvanic isolation barrier between the first voltage domain and the second voltage domain; and
   a differential communication channel configured to communicate data between the first circuit and the second circuit across the galvanic isolation barrier, wherein the first circuit and the second circuit are configured to code the data across the differential communication channel using a first coding technique and a second coding technique,
   wherein the first coding technique comprises ON-OFF shift Keying (OOK) with a differential carrier signal, and
   wherein the second coding technique comprises differential pulse coding.

2. The device of claim 1, wherein the first circuit and the second circuit are formed on different circuit dies and the device comprises a molding compound formed around the different circuit dies.

3. The device of claim 1, wherein the first circuit and the second circuit are formed on a same circuit die during a semiconductor manufacturing process with a trench formed in the circuit die to isolate the first voltage domain from the second voltage domain, and wherein the device comprises a molding compound formed around the circuit die.

4. The device of claim 1, wherein the one or more isolation elements comprise a coreless transformer that galvanically isolates the first voltage domain and the second voltage domain.

5. The device of claim 1, wherein the one or more isolation elements comprise one or more capacitors that galvanically isolate the first voltage domain and the second voltage domain.

6. The device of claim 1,
wherein the first circuit includes a first transmitter configured to encode first information using the first coding technique and a second transmitter configured to encode second information using the second coding technique, and
wherein the second circuit includes a first receiver configured to decode the first information using the first coding technique and a second receiver configured to decode the second information using the second coding technique.

7. The device of claim 1,
wherein the first circuit includes a first transmitter configured to encode first information using the first coding technique and a first receiver configured to decode second information using the second coding technique, and
wherein the second circuit includes a second transmitter configured to encode the second information using the second coding technique and a second receiver configured to decode the first information using the first coding technique.

8. The device of claim 1,
wherein the second circuit comprises a first receiver and a second receiver, wherein the first receiver comprises an envelope detector configured to detect the differential carrier signal and wherein the second receiver comprises an amplitude detector configured to detect pulses associated with the differential pulse coding,
wherein a pulse length of the pulses is less than a detection time associate with the envelope detector and the envelope detector detects the differential carrier signal in the presence of the pulses associated with the differential pulse coding, and
wherein the differential pulse coding defines the pulses with amplitudes are greater than the differential carrier signal and the amplitude detector detects the pulses in the presence of the differential carrier signal.

9. The device of claim 1, wherein the data comprises first data coded in the differential carrier signal and second data coded in the differential pulse coding.

10. The device of claim 9, wherein the first data comprises a switching signal for controlling a high-side power switch via a high-side driver circuit operating in the second voltage domain, and wherein the second data comprises configuration data for the high-side driver circuit operating in the second voltage domain.

11. The device of claim 10, wherein the first data is communicated when the high-side power switch or a low-side power switch is in an ON state, wherein the high-side power switch and the low-side power switch are arranged in a half-bridge configuration, and wherein the second data is communicated during dead time when both the high-side power switch and the low-side power switch are in an OFF state.

12. The device of claim 1, wherein the device comprises a circuit package that includes a molding compound formed around the first circuit, the second circuit, the one or more isolation elements, and the differential communication channel.

13. A method comprising:
communicating first data between a first circuit and a second circuit via a differential communication channel across a galvanic isolation barrier within a circuit package, wherein the first data is coded via a first coding technique that comprises ON-OFF shift Keying (OOK) with a differential carrier signal; and
communicating second data between the first circuit and the second circuit via the differential communication channel across the galvanic isolation barrier within the circuit package, wherein the second data is coded via a second coding technique comprises differential pulse coding.

14. The method of claim 13, further comprising:
communicating the first data from the first circuit to the second circuit across the galvanic isolation barrier within the circuit package; and
communicating the second data from the second circuit to the first circuit across the galvanic isolation barrier within the circuit package.

15. The method of claim 13, further comprising:
communicating the first data from the first circuit to the second circuit across the galvanic isolation barrier within the circuit package; and
communicating the second data from the first circuit to the second circuit across the galvanic isolation barrier within the circuit package.

16. The method of claim 13, wherein the second circuit includes an amplitude detector configured to detect pulses associated with the differential pulse coding,
wherein the differential pulse coding defines the pulses with amplitudes are greater than the differential carrier signal and the amplitude detector detects the pulses in the presence of the differential carrier signal.

17. The method of claim 16, wherein the second circuit includes an envelope detector configured to detect the differential carrier signal,
wherein a pulse length of the pulses is less than a detection time associate with the envelope detector and the envelope detector detects the differential carrier signal in the presence of the pulses associated with the differential pulse coding.

18. The method of claim 17, wherein the first data comprises a switching signal for controlling a high-side power switch via a high-side driver circuit operating in a second voltage domain that is different than a first voltage domain associated with the first circuit, and wherein the second data comprises configuration data for the high-side driver circuit operating in the second voltage domain.

19. The method of claim 18, wherein the first data is communicated when the high-side power switch or a low-side power switch is in an ON state, wherein the high-side power switch and the low-side power switch are arranged in a half-bridge configuration, and wherein the second data is communicated during dead time when both the high-side power switch and the low-side power switch are in an OFF state.

* * * * *